(12) United States Patent
Werner et al.

(10) Patent No.: US 7,467,604 B1
(45) Date of Patent: Dec. 23, 2008

(54) HANDS FREE DOG LEASH WHICH ENABLES THE DOG TO MOVE SIDE TO SIDE THROUGH A PULLEY ATTACHMENT AND WHICH INCLUDES ANTI-TANGLING SWIVEL MECHANISMS AND SAFETY MECHANISMS

(75) Inventors: Kirk Werner, Carlsbad, CA (US); Warren Tarbell, Torrance, CA (US)

(73) Assignee: Swing River, LLC, Torrance, CA (US)

( * ) Notice: Subject to any disclaimer, the term of this patent is extended or adjusted under 35 U.S.C. 154(b) by 161 days.

(21) Appl. No.: 11/228,970

(22) Filed: Sep. 15, 2005

(51) Int. Cl.
*A01K 27/00* (2006.01)
(52) U.S. Cl. ..................... 119/770; 119/798
(58) Field of Classification Search .......... 119/769, 119/770, 795, 797, 798, 857; 482/121, 122, 482/124
See application file for complete search history.

(56) References Cited

U.S. PATENT DOCUMENTS

| | | | | |
|---|---|---|---|---|
| 502,954 | A | * | 8/1893 | Crepeau ........................ 54/34 |
| 2,994,300 | A | * | 8/1961 | Grahling ..................... 119/770 |
| 3,104,650 | A | * | 9/1963 | Grahling ..................... 119/770 |
| 3,721,216 | A | | 3/1973 | Lippe et al. |
| 4,667,624 | A | * | 5/1987 | Smith ......................... 119/770 |
| 4,681,303 | A | | 7/1987 | Grassano |
| 5,038,719 | A | * | 8/1991 | McDonough ............... 119/772 |
| 5,080,045 | A | | 1/1992 | Reese et al. |
| 5,161,486 | A | | 11/1992 | Brown |
| 5,213,063 | A | * | 5/1993 | Franck, III .................. 119/797 |
| D350,628 | S | * | 9/1994 | Williams ................... D30/153 |
| 5,351,654 | A | * | 10/1994 | Fuentes ...................... 119/770 |
| 5,362,295 | A | * | 11/1994 | Nurge ........................ 482/124 |
| 5,632,234 | A | * | 5/1997 | Parker ........................ 119/795 |
| 5,664,639 | A | * | 9/1997 | Worth ............................ 182/3 |
| 5,718,189 | A | * | 2/1998 | Blake ......................... 119/770 |
| 5,724,921 | A | | 3/1998 | Bell |
| 5,795,274 | A | * | 8/1998 | Kasbohm .................... 482/115 |
| 5,803,881 | A | * | 9/1998 | Miller ........................ 482/124 |
| 5,806,467 | A | * | 9/1998 | Arakawa .................... 119/771 |
| 5,842,444 | A | * | 12/1998 | Perrulli ....................... 119/770 |
| D407,866 | S | | 4/1999 | Perrulli |
| D408,598 | S | * | 4/1999 | Martell ..................... D30/153 |
| 5,950,569 | A | | 9/1999 | Perrulli |
| 6,085,698 | A | | 7/2000 | Klein |
| 6,095,093 | A | * | 8/2000 | Kisko et al. ................. 119/770 |

(Continued)

FOREIGN PATENT DOCUMENTS

FR     2673807 A1 * 9/1992

*Primary Examiner*—Michael R Mansen
*Assistant Examiner*—Joseph W Sanderson
(74) *Attorney, Agent, or Firm*—Thomas I. Rozsa

(57) ABSTRACT

The present invention is a hand free dog leash which enables a person to walk his/her dog without having to hold the leash. The invention includes unique features of having a pulley which rides on a flexible waist cord which in turn is attached by swivels to a waist belt to permit the dog to move side to side without unbalancing the person. The leash also includes a leash handle and a quick release mechanism to release the dog from the pulley and waist belt in the event of an emergency. The leash has a flexible coil and hook assembly to prevent the leash from abruptly pulling on the dog's collar and neck and also provides flexibility to permit the dog to move without unbalancing the person.

31 Claims, 12 Drawing Sheets

U.S. PATENT DOCUMENTS

| | | |
|---|---|---|
| 6,192,835 B1 | 2/2001 | Calhoun et al. |
| 6,220,003 B1 * | 4/2001 | Hung .......................... 54/23 |
| D454,992 S | 3/2002 | Yantz |
| 6,449,815 B1 | 9/2002 | Spiller |
| 6,450,129 B1 * | 9/2002 | Flynn ........................ 119/770 |
| 6,626,131 B2 * | 9/2003 | Moulton, III ............... 119/770 |
| 6,851,393 B2 * | 2/2005 | Bremm ...................... 119/770 |
| 6,932,027 B1 * | 8/2005 | Whitney ..................... 119/770 |
| 6,971,334 B1 * | 12/2005 | Livesay et al. ............. 119/798 |
| 7,096,827 B2 * | 8/2006 | Sporn ........................ 119/797 |
| 2002/0073936 A1 | 6/2002 | Fields-Babineau |
| 2004/0112303 A1 * | 6/2004 | Moulton, III ............... 119/795 |
| 2004/0195900 A1 * | 10/2004 | The et al. .................. 297/463.2 |
| 2005/0227833 A1 * | 10/2005 | Wilkinson .................. 482/124 |
| 2005/0229867 A1 * | 10/2005 | Green ........................ 119/770 |

* cited by examiner

FIG. 9
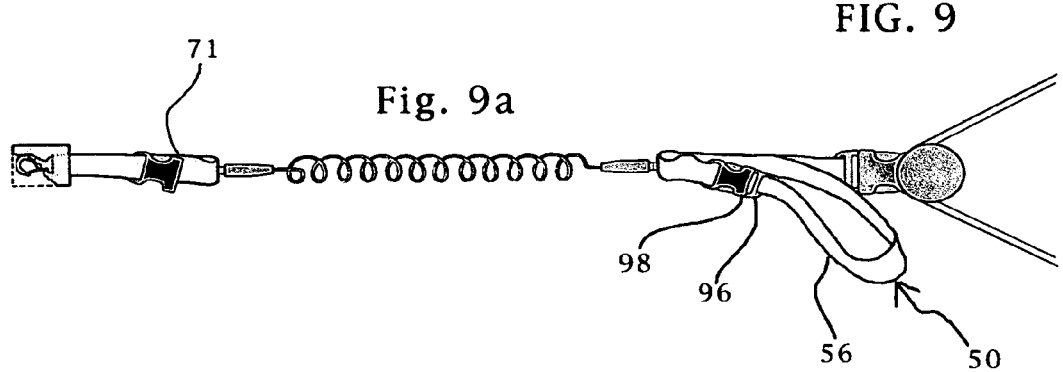
Fig. 9a
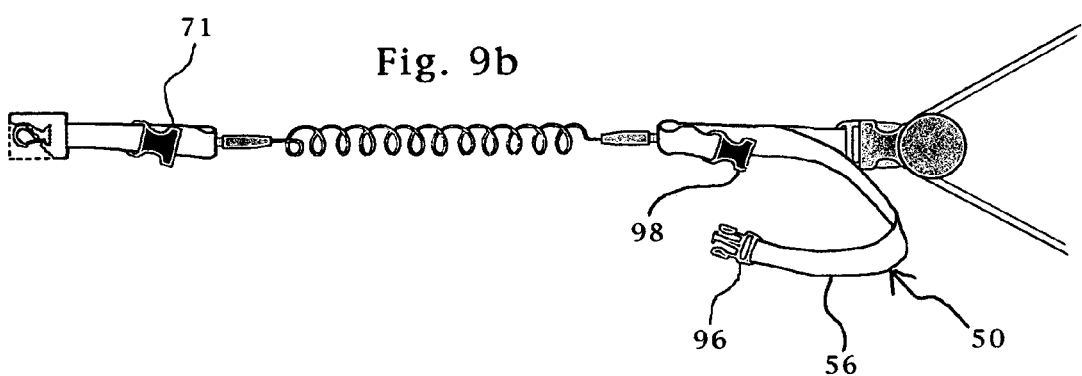
Fig. 9b
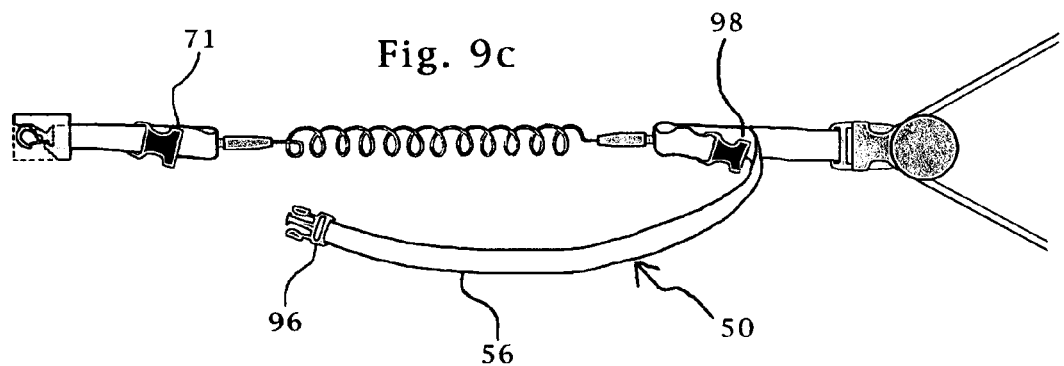
Fig. 9c
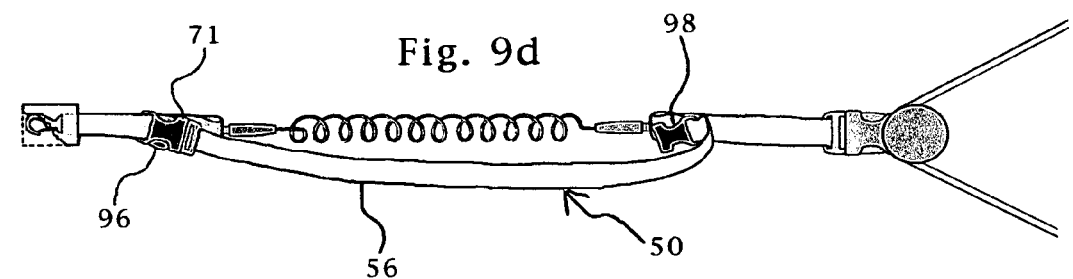
Fig. 9d

US 7,467,604 B1

HANDS FREE DOG LEASH WHICH ENABLES THE DOG TO MOVE SIDE TO SIDE THROUGH A PULLEY ATTACHMENT AND WHICH INCLUDES ANTI-TANGLING SWIVEL MECHANISMS AND SAFETY MECHANISMS

BACKGROUND OF THE INVENTION

1. Field of the Invention

The present invention relates to the field of dog leashes and in particular to leashes which can be attached to a portion of the person's garment or worn by a person so that the person does not have to hold the dog leash in the person's hand while walking the dog.

2. Description of the Prior Art

In general, the concept of a hands free dog leash has been known in the prior art. The following 14 patents are relevant to the field of the present invention.

1. U.S. Pat. No. 5,161,486 issued to Brown on Nov. 10, 1992 for "Hands-Free Dog Jogger Apparatus" (hereafter the "Brown patent");

2. U.S. Pat. No. 5,080,045 issued to Reese et al. on Jan. 14, 1992 for "Jogger's Pet Leash" (hereafter the "Reese patent");

3. U.S. Pat. No. 3,721,216 issued to Lippe et al. on Mar. 20, 1973 for "Belt or Collar with Runner Track" (hereafter the "Lippe patent");

4. U.S. Pat. No. 4,681,303 issued to Grassano on Jul. 21, 1987 for "Shock-Absorbent Connector" (hereafter the "Grassano patent");

5. U.S. Pat. Des. 408,598 issued to Martell on Apr. 20, 1999 for "Utility Belt for Tethering a Dog Leash While Walking and Running" (hereafter the "Martell patent");

6. U.S. Pat. Des. 407,886 issued to Perrulli on Apr. 6, 1999 for "Waist Mounted Dog Leash" (hereafter the "'886 Perrulli patent");

7. U.S. Pat. No. 5,950,569 issued to Perrulli on Sep. 14, 1999 for "Hands Free Dog Leash" (Hereafter the '569 Perrulli patent");

8. U.S. Pat. No. 6,192,835 B1 issued to Calhoun et al. on Feb. 27, 2001 for "Hands-Free Pete Leash System (hereafter the "Calhoun patent");

9. U.S. Pat. No. 6,085,698 issued to Klein on Jul. 11, 2000 for "Night Visibility Enhanced Clothing and Dog Leash" (hereafter the "Klein patent");

10. U.S. Pat. No. 6,095,093 issued to Kisko et al. on Aug. 1, 2000 for "Animal Leash Assembly" (hereafter the "Kisko patent");

11. U.S. Pat. D454,992 issued to Yantz on Mar. 26, 2002 for "Hands Free Animal Leash" (hereafter the "Yantz patent");

12. United States Patent Application Publication No. US 2002/0073936 A1 published on Jun. 20, 2002 to Miriam Fields-Babineau for "Comfort Trainer" (hereafter the "Fields-Babineau patent");

13. U.S. Pat. No. 6,449,815 B1 issued to Spiller on Sep. 17, 2002 for "Adjustable Strap Assembly" (hereafter the "Spiller patent").

14. U.S. Pat. No. 5,724,921 issued to Bell on Mar. 10, 1998 for "Pet Leash" (hereafter the "Bell patent").

The Brown patent discloses a hands free dog leash which includes a waist belt with two attachment points for a flexible shock cord 16. The animal lead 3 is attached to cord 16 with a quick release clasp 19 such as a rigid plastic clasp hook 20. Animal lead 3 is adjustable in length but is not specified as shock absorbing.

The Reese patent discloses a belt fastened snugly about a person's middle region with a larger Hula Hoop-like ring 14 suspended from the belt. The dog's lead is attached to ring 14 and can slide half-way around ring 14. Although the belt encircles the runner's waist, the ring is suspended at about hip level so that the leash exerts a force closer to the person's center of mass. The leash terminates in a ball shaped end portion 48 that slides in a slot 44 in the suspended ring. The leash is described as automatically returning to the coiled state shown in FIG. 3.

The Lippe patent discloses a belt with a slidable attachment point. One of the uses envisioned is as a collar for a dog, so that the leash creates less stress on the dog's neck.

The Grassano patent discloses a dog leash that includes a pneumatic cylinder for absorbing sudden forces.

The Martell patent discloses a belt to which a dog leash may be attached. The belt includes a zippered pocket that is for storing the leash.

The Perrulli Design and Utility patents disclose a belt to which a dog leash is attached and which allows the dog leash to slide sideways.

The Calhoun patent discloses a simple belt with a slidably attached leash.

The Klein patent discloses a system for illuminating dog leashes and other articles.

The Kisko patent discloses a dog leash which is attached to the upper portion of a person's arm.

The Yantz patent is a design patent for a simple hands free dog leash.

The Fields-Babineau patent is a dog muzzle.

The Spiller patent discloses an adjustable strap assembly.

The Bell patent discloses a hand leash wherein a pulley is incorporated into the hand leash to enable both hands to move back and forth through the pulley while a person is jogging with a dog.

While the general concept of a hands free dog leash has been disclosed in many of the above referenced patents, there is a significant need for improvements in the hands free dog leashes of the prior art to better facilitate the dog's movement and prevent the person from being pulled off balance by the dog.

SUMMARY OF THE INVENTION

The present invention is a hands free dog leash which enables a person to walk his/her dog without having to hold the leash. The leash can also be disconnected from a waist belt and used as a hand held leash. The invention includes unique features of having a pulley which rides on a flexible waist cord which in turn is attached by swivels to a waist belt to permit the dog to move side to side without unbalancing the person. The leash also includes a leash handle and a quick release mechanism to release the dog from the pulley and waist belt in the event of an emergency. The leash has a flexible coil and hook assembly to prevent the leash from abruptly pulling on the dog's collar and neck and also provides flexibility to permit the dog to move without unbalancing the person.

It has been discovered, according to the present invention, that if a dog leash includes a waist belt worn by the person and a pulley assembly which rides on a flexible cord attached adjacent to the hip area of the waist belt by swivels, then the person can walk the dogs without having to hold onto the leash and the pulley mechanism enables the dog to move side to side without unbalancing the person and the swivels will prevent the assembly from tangling as the dog moves side to side.

It has further been discovered, according to the present invention, that if the hands free dog leash includes a leash handle and a quick release mechanism, then in the event of an emergency, the person can grasp the leash handle and quickly uncouple the dog from the pulley and waist belt.

It has additionally been discovered, according to the present invention, that if the hands free dog leash includes an elastic coil and a connecting hook assembly, the hands free leash will have sufficient flexibility so that it will not abruptly pull on the dog collar and the dog's neck and the elastic coil will prevent the leash from becoming tangled under the dog's legs.

It has also been discovered, according to the present invention, that if the elastic coil is connected to the leash handle by a swivel and is also connected to the hook assembly by a swivel, then the hands free leash will reduce the risk of tangling as the dog moves side to side.

It has additionally been discovered, according to the present invention, that if the hook contains a padded hook cover, then in the event the hook accidentally comes loose from the dog collar and recoils, the padded cover will significantly reduce any injury to the person from the recoiling hook on the dog collar.

It is therefore an object of the present invention to provide a dog leash which includes a waist belt worn by the person and a pulley assembly which rides on a flexible cord attached adjacent to hip area of the waist belt by swivels so that the person can walk the dog without having to hold onto the leash and the pulley mechanism enables the dog to move side to side without unbalancing the person and the swivels will prevent the assembly from tangling as the dog moves side to side.

It is a further object of the present invention to provide a hands free dog leash which includes a leash handle and a quick release mechanism so that in the event of an emergency, the person can grasp the leash handle and quickly uncouple the dog from the pulley and waist belt.

It is an additional object of the present invention to provide a hands free leash which includes an elastic coil and a connecting hook assembly, so that the hands free leash will have sufficient flexibility so that it will not abruptly pull on the dog collar and the dog's neck and so that the elastic coil will prevent the leash from becoming tangled under the dog's legs.

It is also an object of the present invention to provide an elastic coil which is connected to the leash handle by a swivel and is also connected to the hook assembly by a swivel so that the hands free leash will not tangle as the dog moves side to side.

It is an additional object of the present invention to provide a padded hook cover so that in the event the hook accidentally comes loose from the dog collar and recoils, the padded cover will significantly reduce any injury to the person from the recoiling hook on the dog collar.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 9a is a side view of the preferred embodiment of the present invention hands free dog leash with the hand leash buckle in the closed condition when used as a hands free dog leash;

FIG. 9b is a side view of the preferred embodiment of the present invention hands free dog leash with the male buckle of the hand leash buckle unbuckled from the female buckle of the hand leash;

FIG. 9c is a side view of the preferred embodiment of the present invention hands free dog leash with the male buckle of the hand leash close to the female buckle on the nylon webbing;

FIG. 9d is a side view of the preferred embodiment of the present invention hands free dog leash with the male buckle of the hand leash connected to the female buckle on the nylon webbing;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
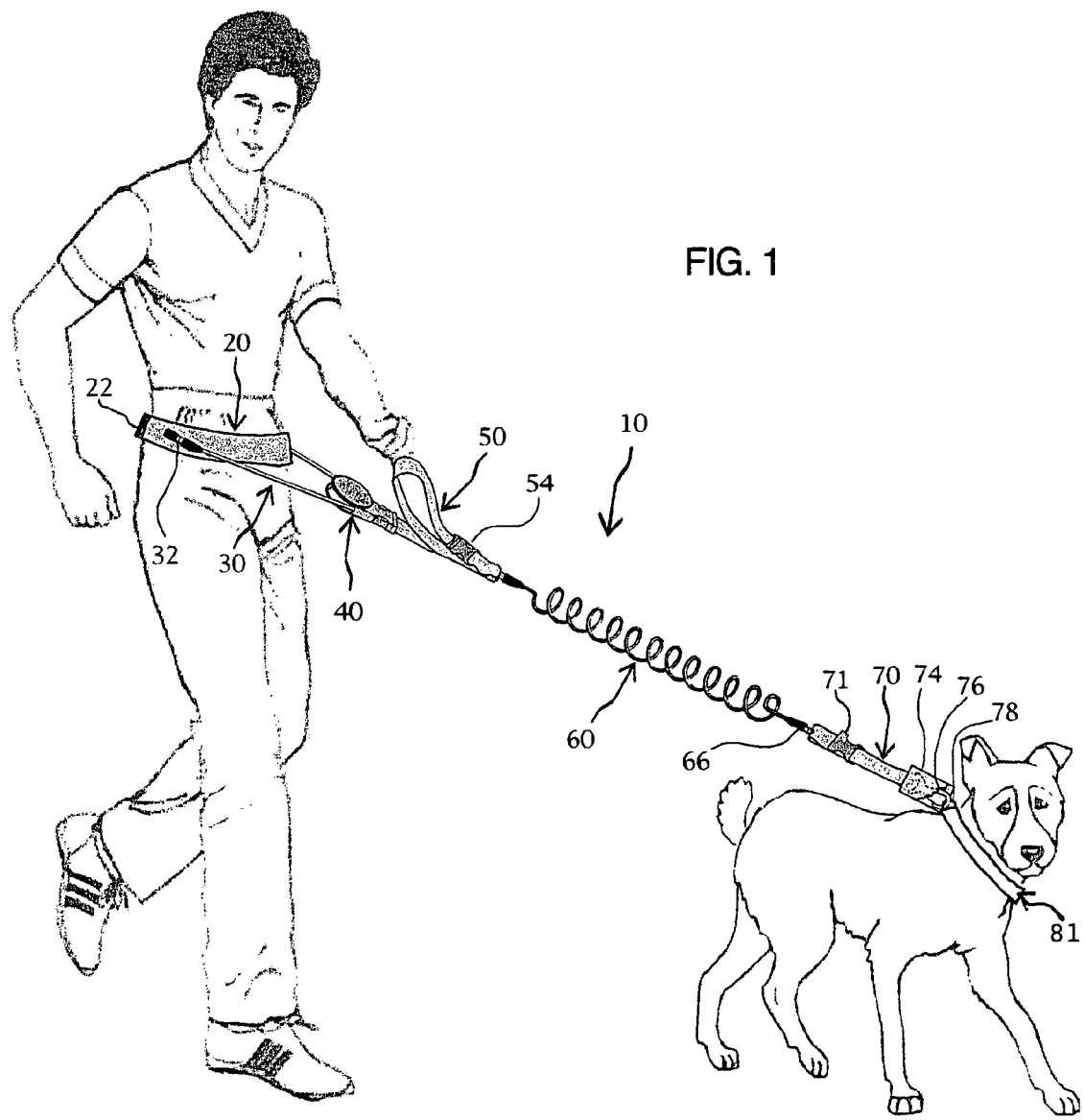
FIG. 1 is a perspective view of a person wearing a preferred embodiment of the present invention hands free dog leash around the person's waist with a dog having the collar of the hands free dog leash worn around the dog's neck, illustrating how the dog is walked with the present invention hands free dog leash.
Figure 2:
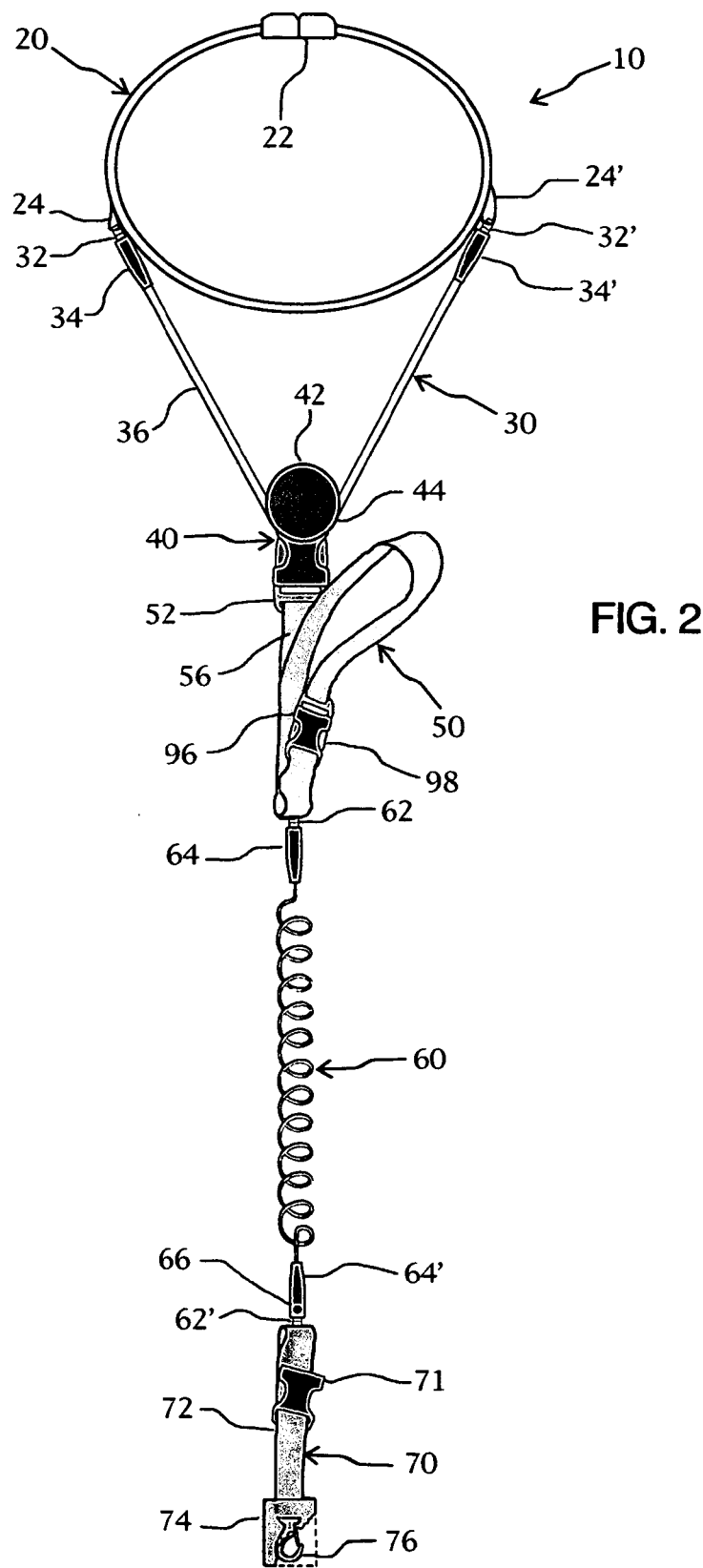
FIG. 2 is a top plan view of the preferred embodiment of the present invention hands free dog leash.
Figure 5:
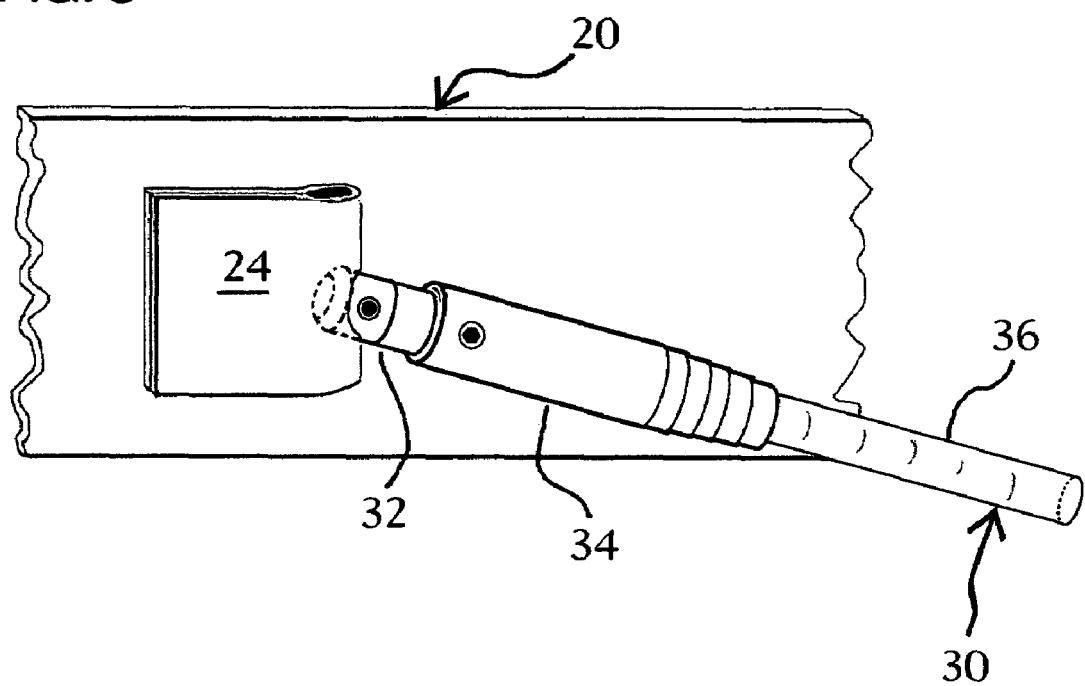
FIG. 5 is an enlarged perspective view of the swivel attachment mechanism by which the flexible cord is attached to the waist belt of the present invention.
Figure 6:
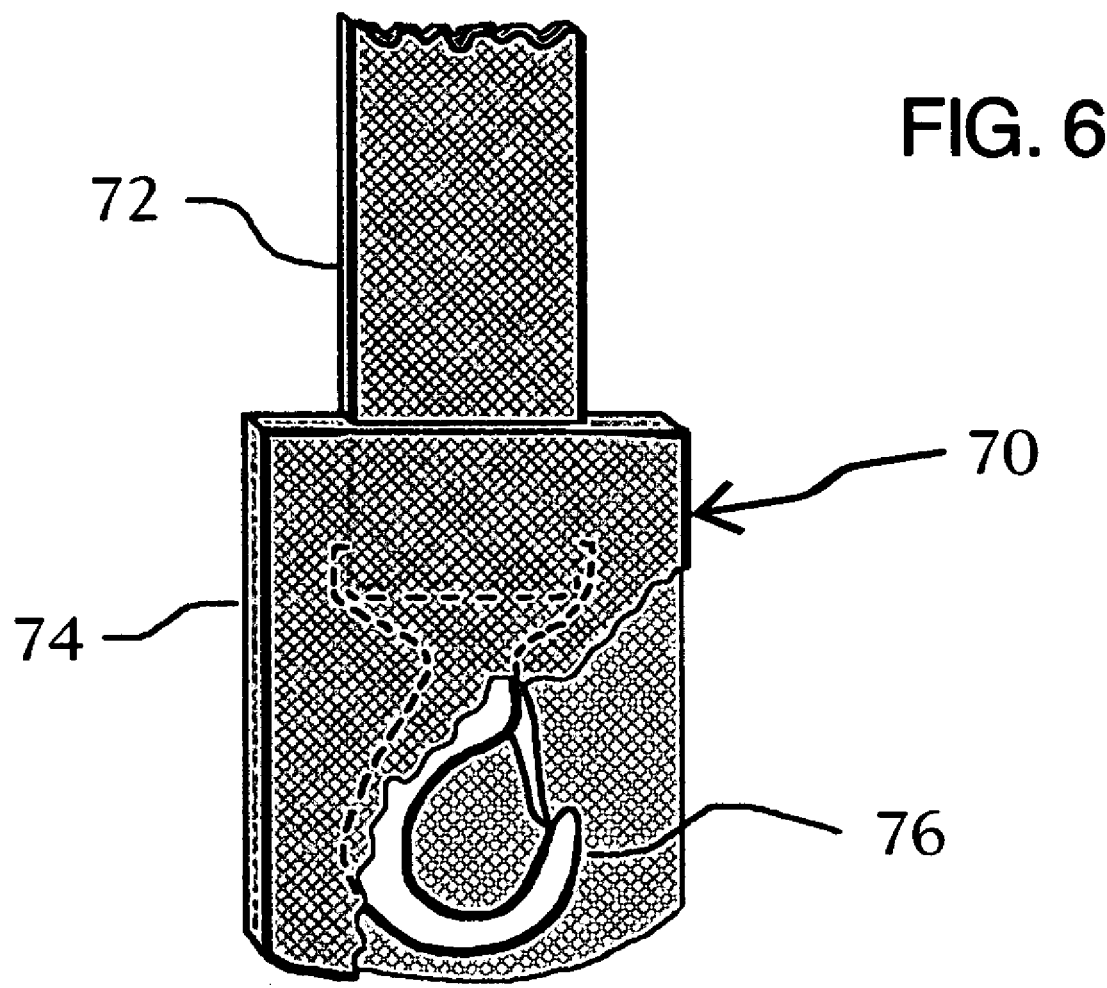
FIG. 6 is a top plan view of the hook attachment mechanism and padded hook cover of the present invention.

Referring to FIGS. 1 and 2, there is illustrated a preferred embodiment of the present invention hands free dog leash 10 with all of its operating components. The hands free dog leash 10 is comprised of an adjustable belt 20 which by way of example is made of nylon webbing. As illustrated in FIG. 1, the adjustable belt 20 is worn around a person's waist and is connected at the rear by belt buckle 22. In the preferred embodiment, the belt buckle 22 is centrally positioned on the rear so that it can be easily connected and disconnected by the person placing his/her hands behind them to connect or disconnect the buckle. One of the key innovative features of the present invention is a flexible waist cord 30 which is attached to the adjustable belt 20 at each end by a swivel 32. As illustrated in FIG. 5 each end 36 of flexible waist cord 30 is attached to a connector 34 which in turn is attached to a metal swivel 32 which in turn is connected to a flexible nylon webbing tab 24 which is attached to waist belt 20. Each end 36 of flexible waist cord 30 is connected to opposite sides of waist belt 20 in this manner, preferably adjacent a location of the person's hip bones. As illustrated in FIG. 1, nylon webbing tab 24 is positioned on the waist belt 20 so that the waist cord connection is slightly forward of each hip bone on each side of the waist belt 20. By way of example, the connector 34 can be made of plastic and the waist cord 30 is round and made of plastic or other flexible elastic material. The metal swivels assure that the flexible waist cord 30 will not become tangled as the dog pulls on the hands free leash.

Figure 3:
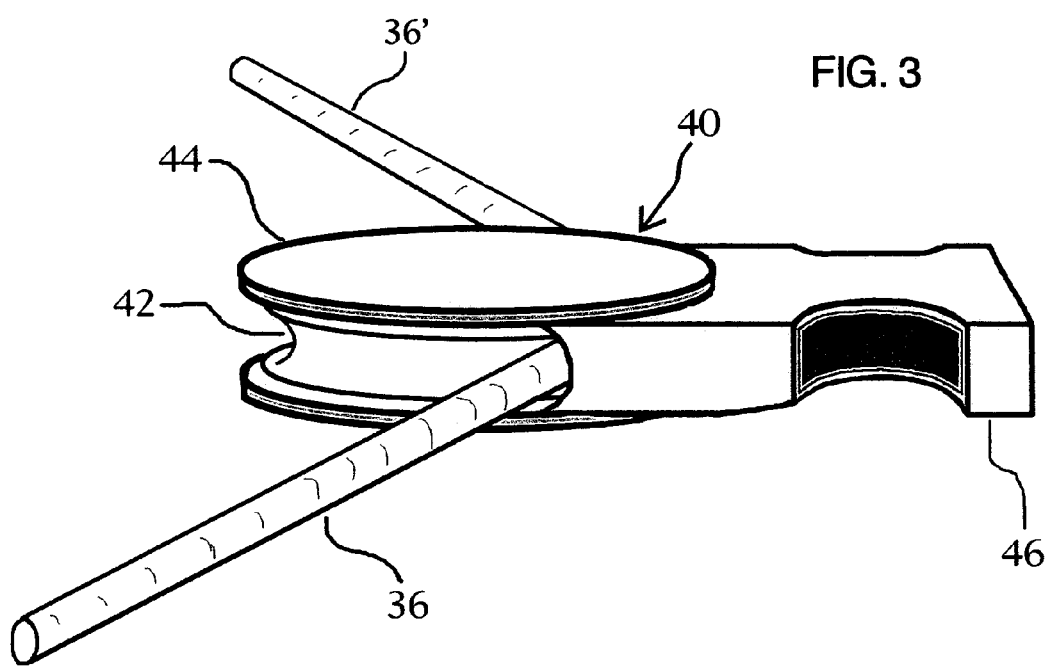
FIG. 3 is an enlarged perspective view of the pulley mechanism which rolls on the flexible cord which is attached to the waist belt of the present invention, where the pulley has a cover which is connected to a female receiving buckle.
Figure 4:
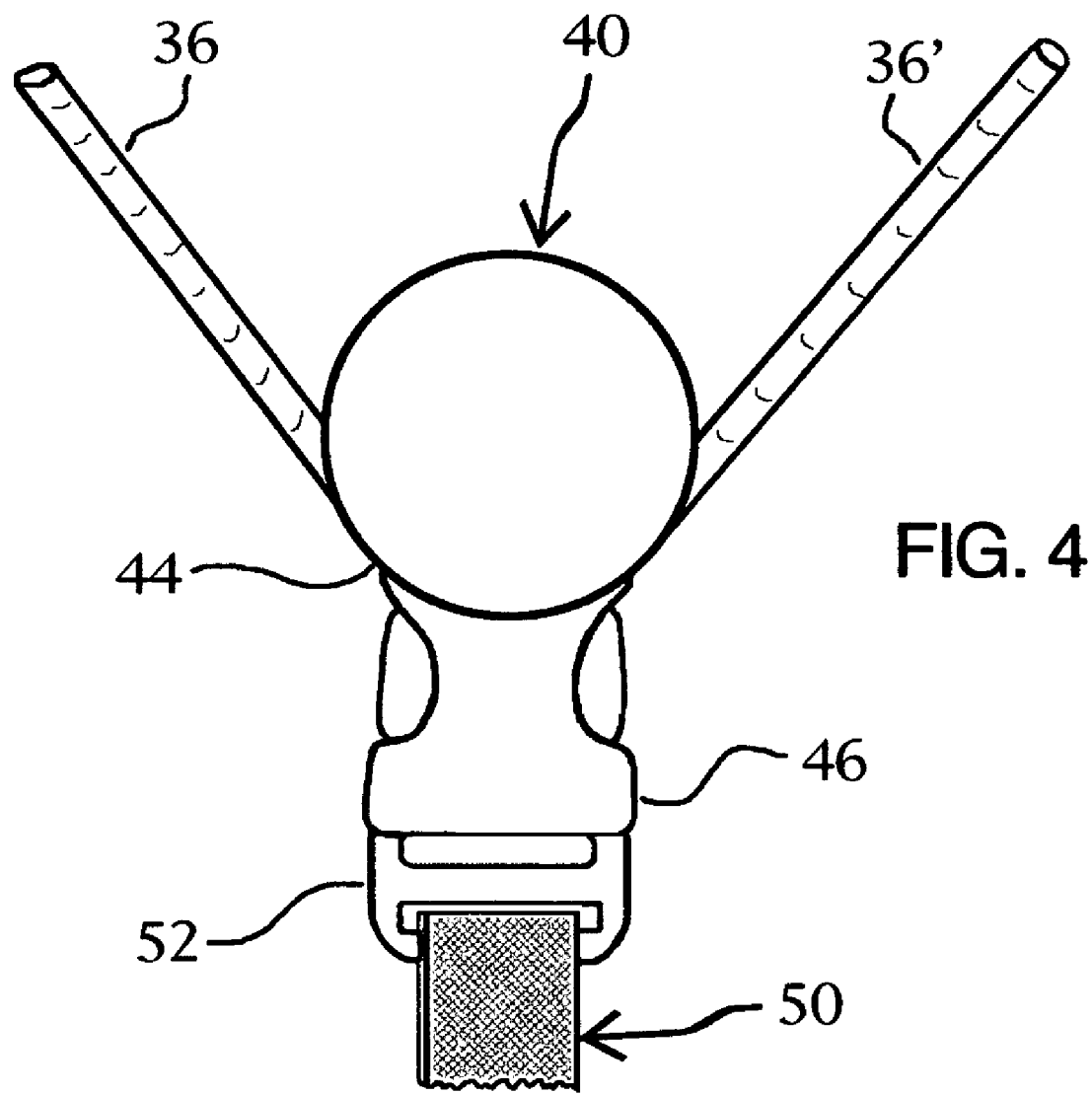
FIG. 4 is an enlarged top plan view of the pulley mechanism which rolls on the flexible cord which is attached to the waist belt of the present invention, where the pulley has a cover which is connected to a female receiving buckle.

A second key innovative feature of the present invention hands free leash is the incorporation of a pulley 40 which rides on the flexible waist cord 30 so that the pulley 40 can roll back and forth along the entire length of the flexible waist cord 30 from the connector 34 on one end to the oppositely disposed connector on the other end. FIG. 1 shows a preferred embodiment of the present invention pulley 40 which has a pulley cover 44 which in turn is connected to a female receiving buckle 46. As illustrated in FIG. 3, the pulley 40 has a roller portion 42 which rides on the flexible elastic cord 30 and a cover 44 which protects the user's hands from being pinched between the flexible elastic cord 30 and the pulley roller 42 during the vigorous forces imparted on it while a dog is pulling on the hands free leash. A logo can also be placed on the pulley cover 44. The forward end of the pulley facing away from the person is attached to the female receiving buckle 46 which in turn is connected to a male disconnect buckle 52. It is preferred that buckle 46 is female and buckle 52 is male but it is also within the spirit and scope of the present invention for buckle 46 to be male and buckle 52 to be female. In the preferred embodiment, the buckle attachment 46 is molded with the pulley cover 44.

Referring to FIGS. 1 and 2, a leash handle 50 is affixed to the male disconnect buckle 52 by a nylon section 56. The nylon section 56 has a receiving female buckle 96 and a male disconnect buckle 98 connected to it to form a closed leash 50. The quick disconnect buckle attachment 46 and 52 is another innovative feature of the present invention. If the dog is pulling too aggressively, in order to avoid being pulled over, the person can grab a hold of the leash 50 and quickly disconnect the front part of the leash from the pulley assembly.

The hands free leash 10 also includes an elastic coil 60 in order to provide resilience and overall flexibility to the hands free leash. Referring to FIG. 2, at one end the elastic coil 60 is connected to a connector 64 which in turn is connected to a metal swivel 62 which is connected at its opposite end to the nylon section 56 of leash handle 50. The connector 64 is preferably made of plastic. At its opposite end, the flexible coil 60 is connected to connector 64' at one end which in turn is connected to a hook assembly 70 by a metal swivel 62' and a metal set screw 66 for installing a variety of collars and hooks. The hook assembly 70 is comprised of a nylon webbing 72 attached at one end to the metal swivel 62 and attached at its opposite end to hook 76. As an additional safety feature, the nylon webbing 72 includes a padded hook cover 74 to cover the hook. The nylon webbing also supports a female receiving buckle 71. As illustrated in FIG. 1, the hook is attached to the metal ring 78 of a dog collar 81.

The present invention hands free dog collar 10 provides significant improvements over prior art hands free dog leashes. Through use of the present invention, the person can walk or run with his/her dog with the dog safely kept on a leash, while not having to hold the dog leash with one hand. The flexible belt is connected to the flexible waist cord 30 by metal swivels 32 so that as the dog moves from side to side, the swivels 32 will rotate to prevent the flexible waist cord 30 from tangling. Further, as the dog runs or moves side to side by any given distance and angle to the left of or the right of the person, the pulley 42 will ride back and forth on the flexible waist cord 30 so that the dog is free to move and will not trip or unbalance the person or pull the person down. The flexibility of waist cord 30 further enables it to stretch to accommodate the side to side movement of the dog. Because the pulley 42 is adjacent the person's hands as the person walks or runs, as illustrated in FIG. 1, the pulley cover 44 prevents the person's hands from being pinched. In the event the dog sees a cat or another dog and aggressively begins to run and pull toward the cat or other dog, the person can grab a hold of the leash handle 50 and if necessary quickly uncouple the pulley assembly and waist belt 20 from the dog by pressing on buckle 56 to disconnect it from buckle 46 to thereby disconnect the leash 50 and remaining portion of the hands free dog leash 10 attached to the dog and to thereby avoid being unbalanced and possibly being pulled down and sustaining an injury. The swivels 62 and 62' enable the flexible coil 60 to be rotated in any desired way so that the dog can freely move without tangling the hands free dog leash 10 or any of its components. The padded hook cover 74 provides a safety feature which can cover the hook 76. In addition, with the padding 74 over most of the hook 76 when it is attached to the dog collar 78, should the hook 76 accidently come loose from the dog collar 78 and recoil back and hit the person, the padding 74 will significantly reduce any possible injury from the recoiling dog leash. The flexible features of the elastic coil 60 and nylon webbing 72 of the connecting hook assembly 70 provide sufficient stretching so that the dog will not pull on the person as the dog runs and in turn the collar 78 will not pull on the dog's neck. The set screw 66 can be unscrewed so that different types of connecting hook assemblies 70 can be interchanged and used with the present invention.

Figure 10:
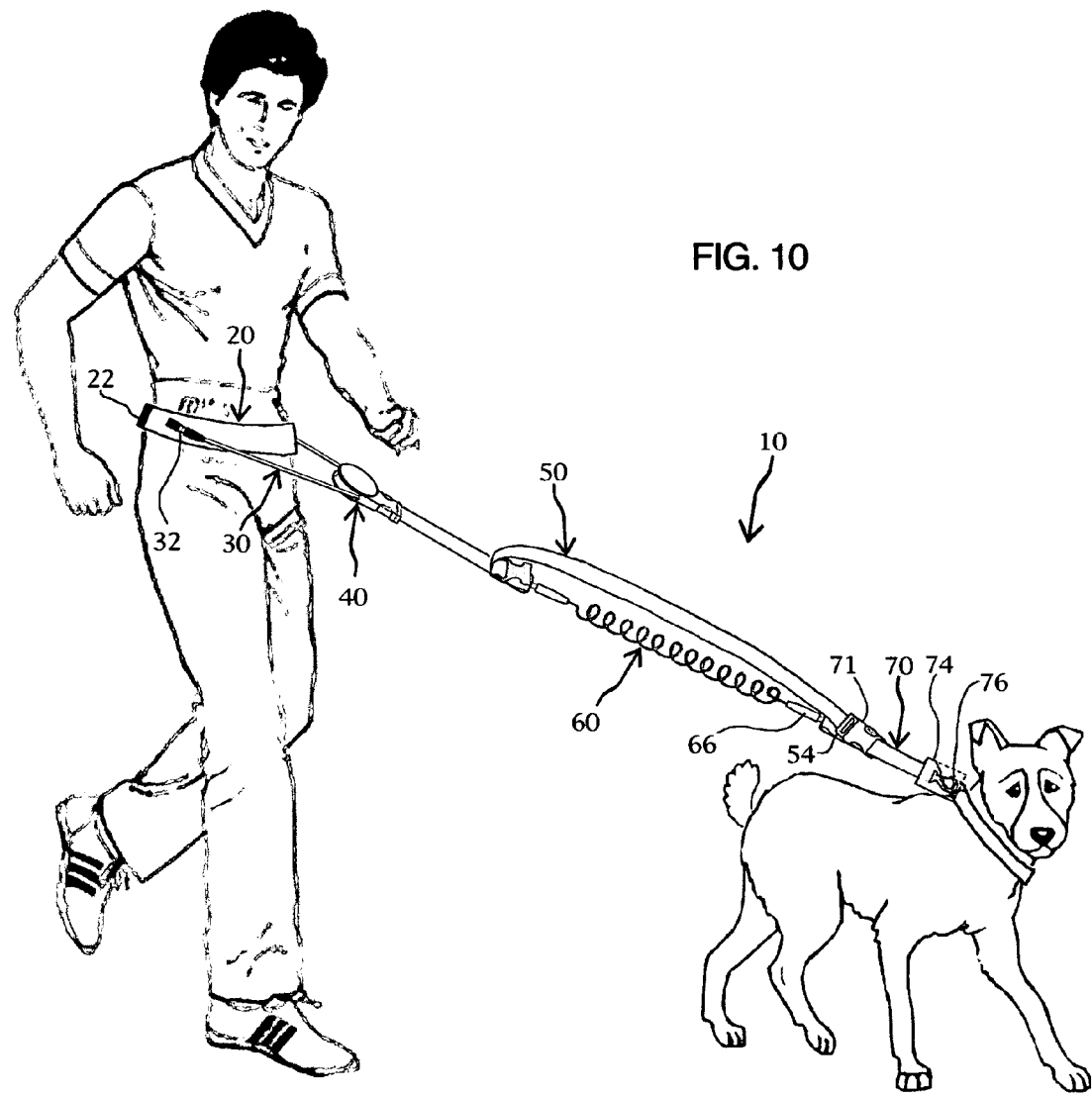
FIG. 10 is a perspective view of a person wearing a preferred embodiment of the present invention hands free dog leash around the person's waist with a dog having the collar of the hands free dog leash worn around the dog's neck, illustrating how the dog is walked with the present invention hands free dog leash with the male buckle of the hand leash connected to the female buckle on the nylon webbing so that the dog is in a more restrained condition.

Another innovative feature of the present invention hands free dog leash 10 is the ability to provide more restraint on the dog as illustrated in FIGS. 9a through 9d. Male disconnect buckle 96 on leash handle 50 can be disconnected from female receiving buckle 98 and connected to female receiving buckle 71 on the nylon webbing 72 of hook assembly 70 as illustrated in FIG. 9d and FIG. 10. In this condition, the leash handle 50 provides an additional restraint on the dog.

Figure 8:
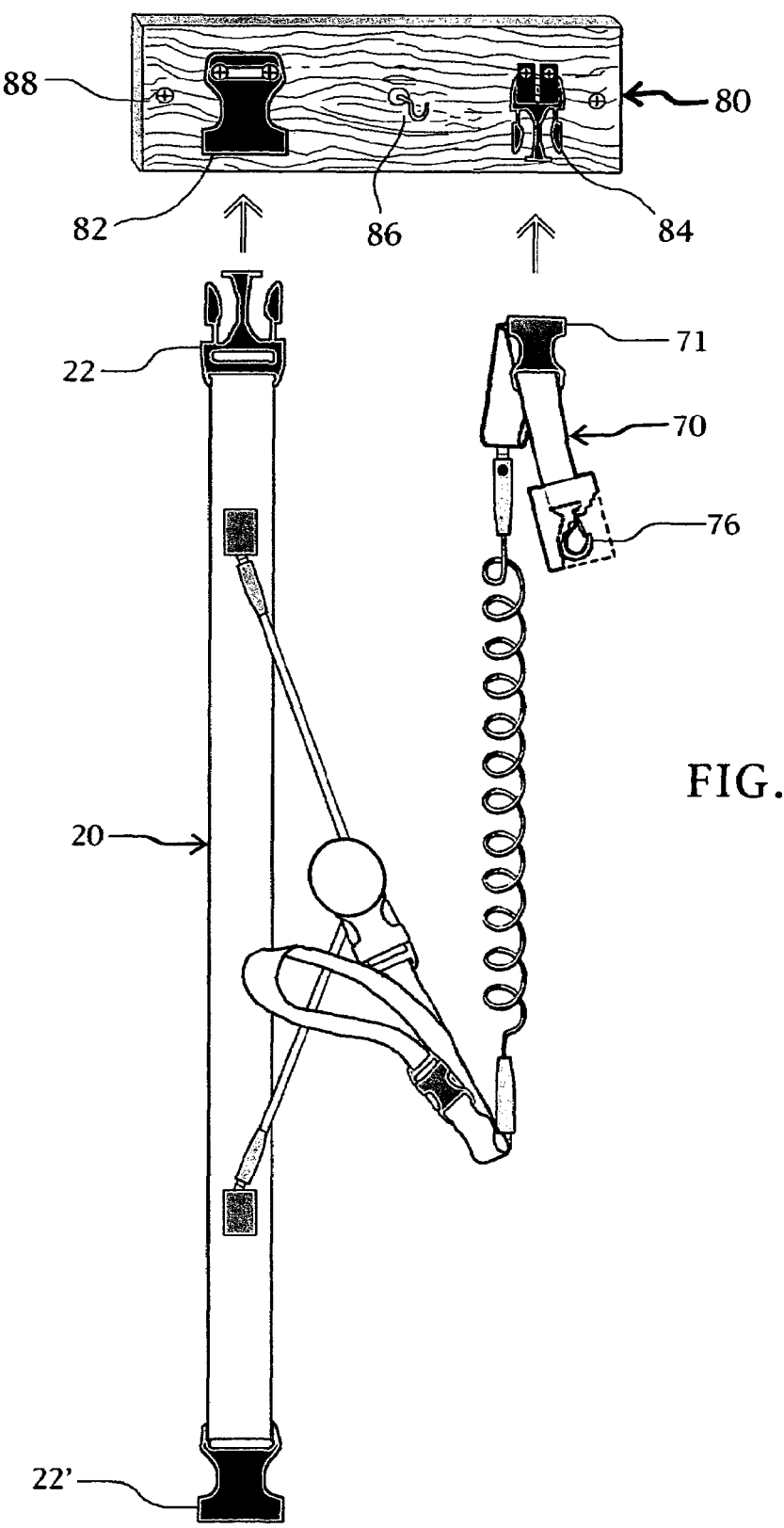
FIG. 8 is an exploded view of a wall mounting bracket to retain the hands free dog leash when it is not in use and illustrating how the present inventions hands free dog leash will be retained on the mounting bracket.

Referring to FIG. 8, when not in use, the hands free dog leash 10 can be removably attached to and retained by a leash mounting rack 80 which can be mounted on a wall. The leash mounting rack 80 comprises a female receiving belt buckle 82 which can receive the belt buckle 22 from belt 20; a male connecting belt buckle 84 which can receive female buckle 71; and a hanging hook 86 which can retain a dog collar, keys, etc.

Figure 11:
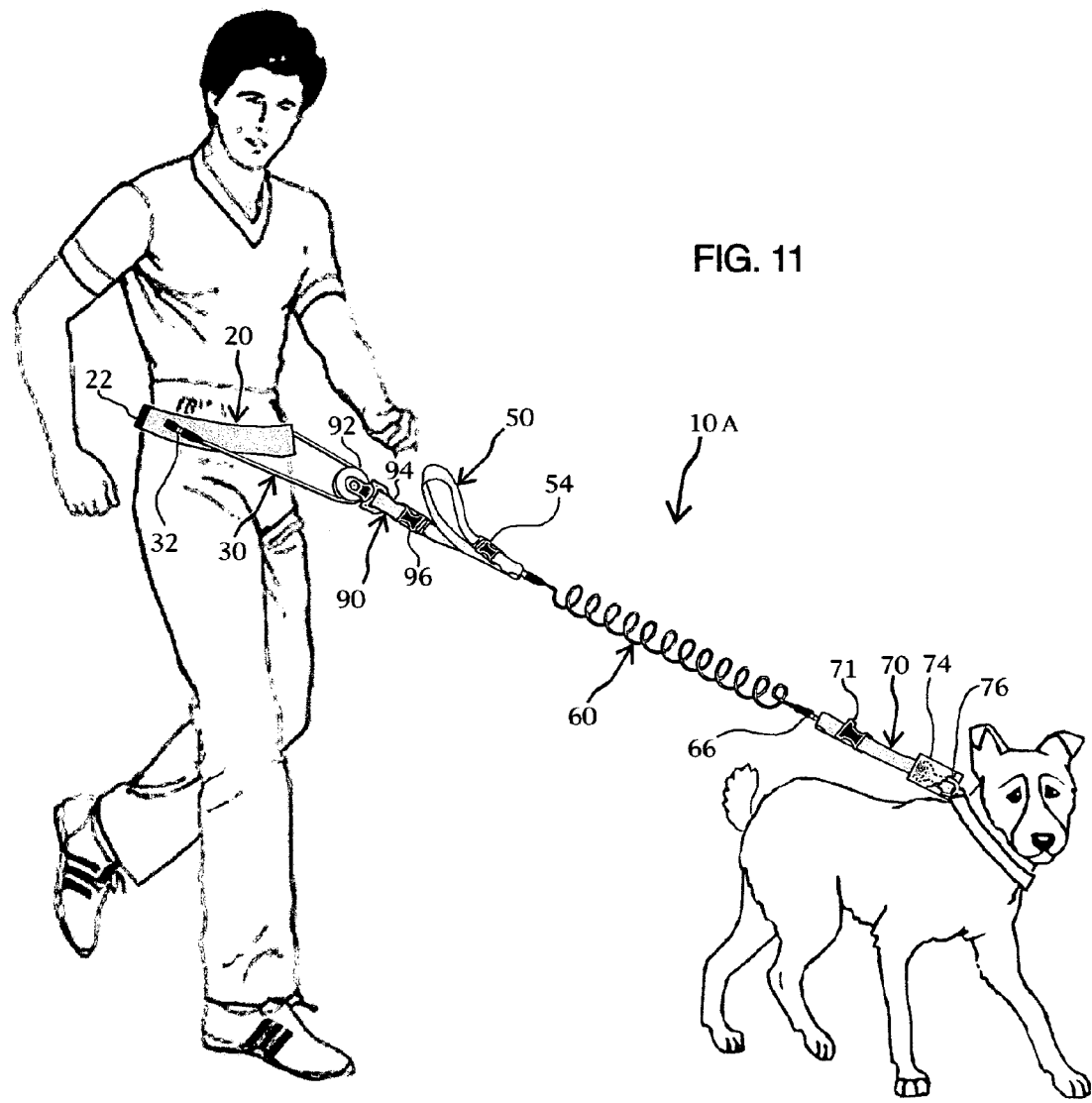
FIG. 11 is a perspective view of a person wearing an alternative embodiment of the present invention hands free dog leash around the person's waist with a dog having the collar of the hands free dog leash worn around the dog's neck, illustrating how the dog is walked with the present invention hands free dog leash.
Figure 12:
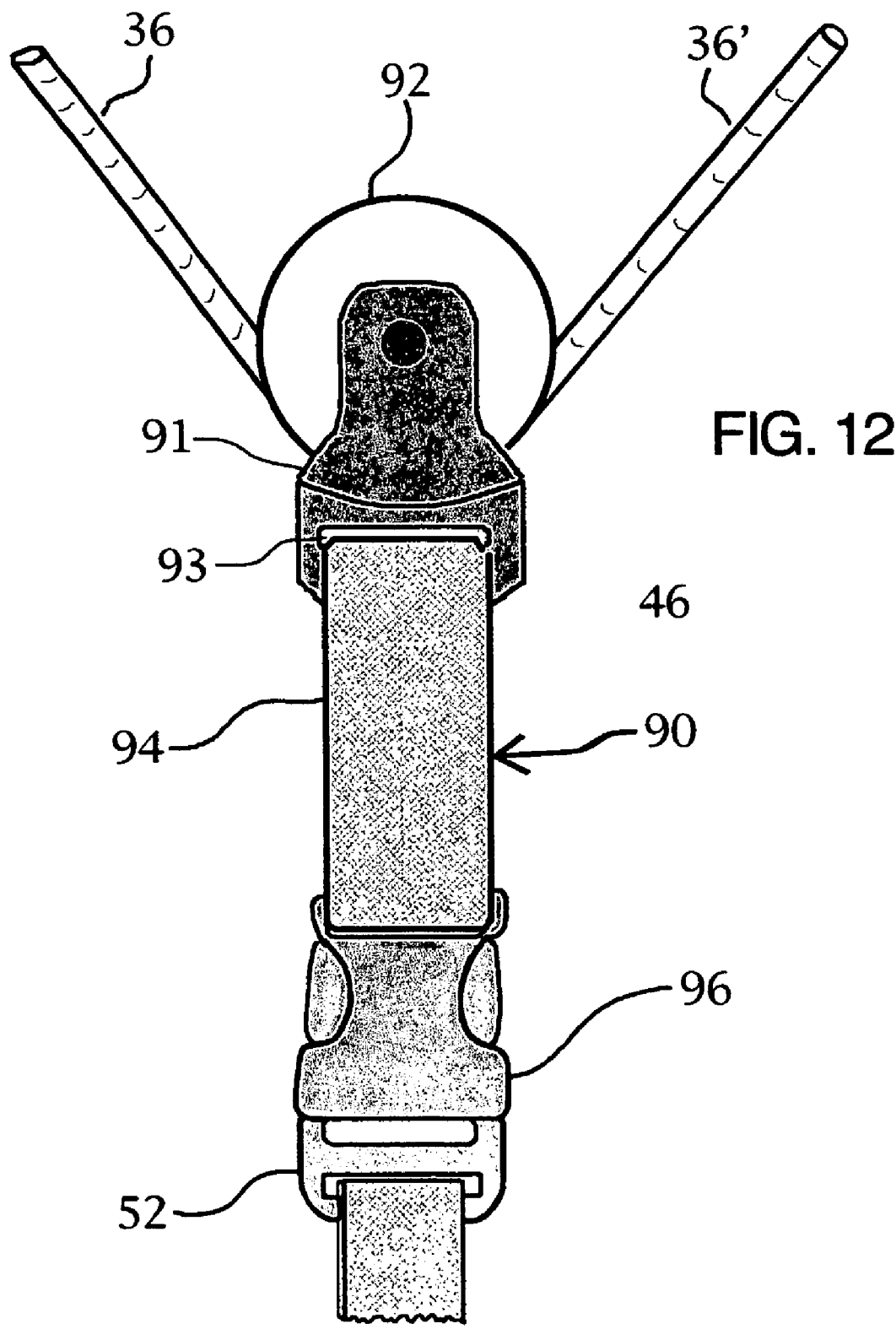
FIG. 12 is an enlarged top plan view of the pulley mechanism of the alternative embodiment of the present invention which rolls on the flexible cord which is attached to the waist belt of the present invention, where the pulley does not have a cover and is attached to a nylon webbing which in turn is attached to a female receiving buckle.

Alternative embodiment of the present invention is illustrated in FIGS. 11 and 12. The alternative embodiment of the hands free dog leash 10A is comprised of an adjustable belt 20 which by way of example is made of nylon webbing. As illustrated in FIG. 11, the adjustable belt 20 is worn around a person's waist and is connected at the rear by belt buckle 22. In the preferred embodiment, the belt buckle 22 is centrally positioned on the rear so that it can be easily connected and disconnected by the person placing his/her hand behind them to connect or disconnect the buckle. One of the key innovative features of the present invention is a flexible waist cord 30 which is attached to the adjustable belt 20 at each end by a swivel 32. As illustrated in FIG. 5 each end 36 of flexible waist cord 301 attached to a connector 34 which in turn is attached to a metal swivel 32 which in turn is connected to a flexible nylon webbing tab 24 which is attached to waist belt 20. Each end 36 of flexible waist cord 30 is connected to opposite sides of waist belt 20 in this manner, preferably adjacent a location of the person's hip bones. As illustrated in FIG. 11, nylon webbing tab 24 is positioned on the waist belt 20 so that the waist cord connection is slightly forward of each hip bone on each side of the waist belt 20. By way of example, the connector 34 can be made of plastic and the waist cord 30 is round and made of plastic or other flexible elastic material. The metal swivels assure that the flexible waist cord 30 will not become tangled as the dog pulls on the hands free leash.

The variation in the alternative embodiment 10A involves the pulley 92 which rides on the flexible waist cord 30 so that the pulley 92 can roll back and forth along the entire length of the flexible waist cord 30 from the connector 34 on one end to the oppositely disposed connector on the other end. FIGS. 11 and 12 shows the alternative embodiment of the present invention pulley 92 which has a cover sleeve mounted on pulley 92 at one end and having a receiving slot 93 at its opposite end. A nylon webbing 9 is received within the receiving slot. The nylon webbing 94 also supports a female receiving buckle 96 which in turn receives the male buckle 52 from leash handle 50. This provides a more flexible attachment between the pulley and the remainder of the hands free dog leash because the nylon webbing 90 is more flexible than the solid pulley cover 44 rigidly attached to the female buckle 46 in the preferred embodiment. The remainder of the hands free leash is the same as in the preferred embodiment and can also accommodate the variations discussed in the preferred embodiment.

While mating buckles have been described as male and female, it will be appreciated that each buckle shown as male could also be female and each male buckle shown as female could also be male.

Figure 7:
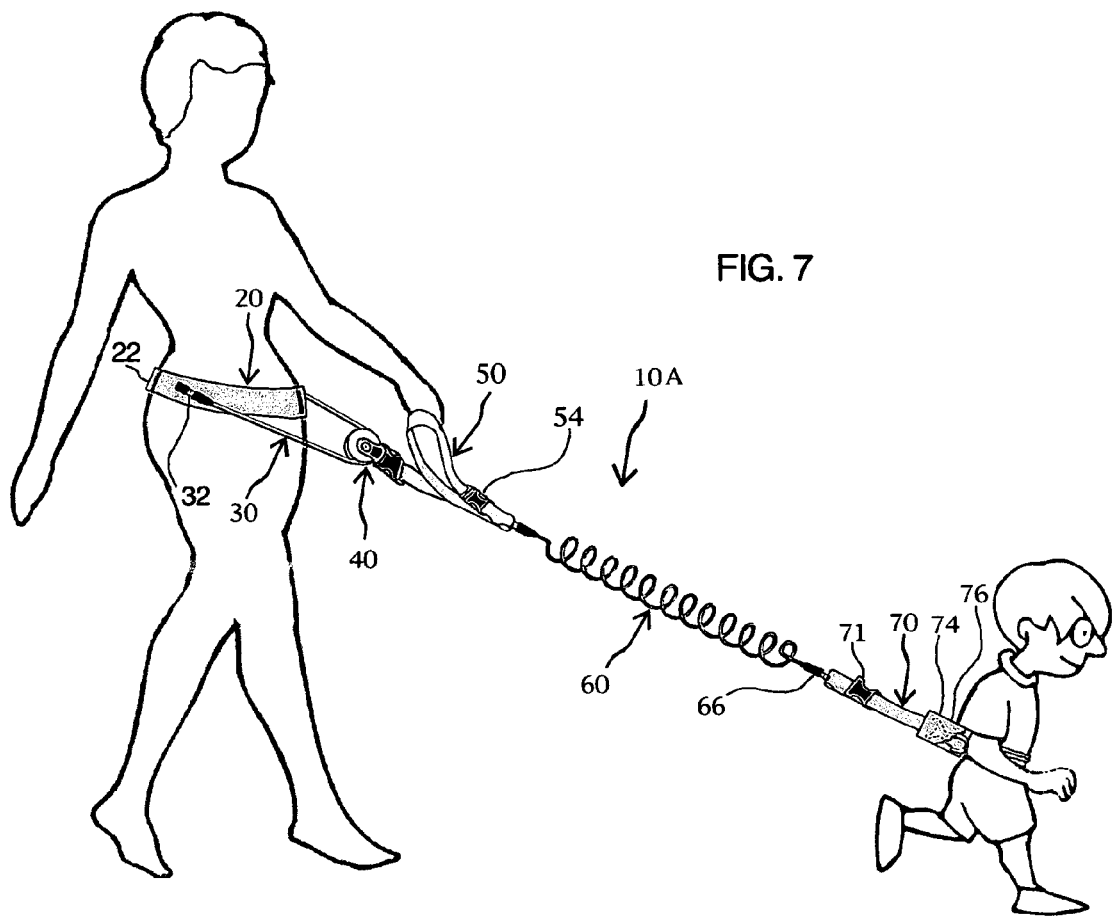
FIG. 7 is a perspective view of an alternative embodiment of the present invention hands free dog leash being used to walk a child.

While the primary use for the present invention is to function as a hands free dog leash, it can also be used as a hands free restraint to walk a small child as illustrated in FIG. 7. The entire apparatus 10A is exactly the same as the hands free dog leash but the connecting hook 76 is attached to a belt worn by the small child, as illustrated in FIG. 7. While the alternative embodiment 10A is illustrated in FIG. 7, the preferred embodiment 10 with the pulley arrangement illustrated in FIGS. 1 through 4 can also be used to walk a child.

Defined in detail, the present invention is a hands free dog leash to be used by a person having a waist and a pair of oppositely disposed hips and attached to a portion of the collar worn by a dog, the dog leash comprising: (a) a belt worn around the waist of the person and fastened behind the person by a mating buckle assembly attached to each respective end of the belt, the flexible belt having a pair of webbing tabs respectively affixed onto the belt at a location adjacent each respective hip area of the person; (b) a flexible waist cord having opposite ends with a connector member attached to each respective end, each connector member connected to a respective webbing tab by a metal swivel; (c) a pulley rotatably mounted on the flexible cord so that the pulley can ride on the flexible cord, the pulley having a covering means and one mating member of a quick disconnect buckle assembly attached to the pulley cover; (d) a leash handle having a mating member of a quick disconnect buckle assembly at one end which interconnects with the mating quick disconnect buckle assembly attached to the covering means of the pulley; and (e) an elastic coil having a connector member at one end through which it is connected to a metal swivel attached to an end of the leash handle and connected at its opposite end by another connector to a metal swivel which in turn is connected to a connecting hook assembly, the connecting hook assembly having a connecting hook at its opposite end and a padded covering member which can cover at least a portion of the connecting hook when it is in use attached to a portion of a dog collar.

Defined broadly, the present invention is a hands free dog leash to be used by a person having a waist and a pair of oppositely disposed hips and attached to a portion of the collar worn by a dog, the dog leash comprising: (a) a belt worn around the waist of the person and fastened behind the person by a mating buckle assembly attached to each respective end of the belt, the flexible belt having a pair of webbing tabs respectively affixed onto the belt at a location adjacent each respective hip area of the person; (b) a flexible waist cord having opposite ends with a connector member attached to each respective end, each connector member connected to a respective webbing tab by a metal swivel; (c) a pulley rotatably mounted on the flexible cord so that the pulley can ride on the flexible cord, the pulley having a covering sleeve mounted on the pulley at one end and having a receiving slot at its opposite end which received a flexible webbing within the receiving slot, the flexible webbing also supporting one mating member of a quick disconnect buckle assembly; (d) a leash handle having a mating member of a quick disconnect buckle assembly at one end which interconnects with the mating quick disconnect buckle assembly supported by the flexible webbing; and (e) an elastic coil having a connector member at one end through which it is connected to a metal swivel attached to an end of the leash handle and connected at its opposite end by another connector to a metal swivel which in turn is connected to a connecting hook assembly, the connecting hook assembly having a connecting hook at its opposite end and a padded covering member which can cover at least a portion of the connecting hook when it is in use attached to a portion of a dog collar.

Defined more broadly, the present invention is a hands free dog leash to be used by a person having a waist and attached to a portion of the collar worn by a dog, the dog leash comprising: (a) a belt worn around the waist of the person and fastened around the person's waist, the flexible belt having a pair of connecting means respectively affixed onto the belt at two spaced apart locations on the flexible belt; (b) a flexible waist cord having opposite ends with each end respectively connected to a connecting means on the flexible belt by a swivel; (c) a pulley rotatably mounted on the flexible cord so that the pulley can ride on the flexible cord, means connecting the pulley to one mating member of a quick disconnect buckle assembly attached to the pulley; (d) a leash handle having a mating member of a quick disconnect buckle assembly at one end which interconnects with the mating quick disconnect buckle assembly attached to the pulley; and (e) an elastic coil having opposite ends and connected at one end to a swivel which in turn is connected to an end of the leas handle and connected at its opposite end to a swivel which in turn is connected to a connecting hook assembly, the connecting hook assembly having a connecting hook at its opposite end and a padded covering member which can cover at least a portion of the connecting hook when it is in use attached to a portion of a dog collar.

Defined even more broadly, the present invention is a hands free dog leash to be used by a person and attached to a portion of the collar worn by a dog, the dog leash comprising: (a) a belt worn around a portion of the person's body; (b) a flexible waist cord having opposite ends with each end respectively connected by a swivel at spaced apart locations on the flexible belt; (c) a pulley rotatably mounted on the flexible cord so that the pulley can ride on the flexible cord, means connecting the pulley to one mating member of a quick disconnect buckle assembly attached to the pulley; (d) a leash handle having a mating member of a quick disconnect buckle assembly at one end which interconnects with the mating quick disconnect buckle assembly attached to the pulley; and (e) an elastic coil have opposite ends and connected at one end to a swivel which in turn is connected to an end of the leash handle and connected at its opposite end to a swivel which in turn is connected to a connecting hook assembly, the connecting hook assembly having a connecting hook at its opposite end.

Defined even more broadly, the present invention is a hands free dog leash to be used by a person and attached to a portion of the collar worn by a dog, the dog leash comprising: (a) a belt worn around a portion of the person's body; (b) a flexible waist cord having opposite ends with each end respectively connected by a swivel at spaced apart locations on the flexible belt; (c) a pulley rotatably mounted on the flexible cord so that the pulley can ride on the flexible cord, means connecting the pulley to one mating member of a quick disconnect buckle assembly attached to the pulley; and (d) a leash handle having a mating member of a quick disconnect buckle assembly at one end which interconnects with the mating quick disconnect buckle assembly attached to the pulley, and a leash connected at its opposite end to elastic means which terminates in a connecting hook which can be attached to a dog collar.

Defined even more broadly, the present invention is a hands free dog leash to be used by a person and attached to a portion of the collar worn by a dog, the dog leash comprising: (a) a belt worn around a portion of the person's body; (b) a flexible waist cord having opposite ends with each end respectively connected by a swivel at spaced apart locations on the flexible belt; and (c) a pulley rotatably mounted on the flexible cord so that the pulley can ride on the flexible cord, means connecting the pulley to an assembly which terminates in a connecting hook which can be attached to a dog collar.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A hands free dog leash to be used by a person having a waist and a pair of oppositely disposed hips and attached to a portion of a dog collar, the dog leash comprising:
   a. a belt for wearing around the waist of the person and fastening behind the person by a mating buckle assembly attached to each respective end of the belt, a flexible belt having a pair of webbing tabs respectively affixed onto the belt at a location adjacent each respective hip area of the person;
   b. a flexible waist cord having opposite ends with a connector member attached to each respective end, each connector member connected to a respective webbing tab by a metal swivel;
   c. a pulley rotatably mounted on the flexible cord so that the pulley can ride on the flexible cord, the pulley having a covering means and one mating member of a quick disconnect buckle assembly attached to the pulley cover;
   d. a leash handle having a mating member of a quick disconnect buckle assembly at one end which interconnects with the mating quick disconnect buckle assembly attached to the covering means of the pulley;
   e. an elastic coil having a connector member at one end through which it is connected to a metal swivel attached to an end of the leash handle and connected at its opposite end by another connector to a metal swivel which in turn is connected to a connecting hook assembly, the connecting hook assembly comprising having a connecting hook at its opposite end and a padded covering member which can cover at least a portion of the connecting hook when it is in use attached to a portion of the dog collar, the connecting hook assembly further comprising a nylon webbing connected at one end to the metal swivel, and at its other end to the connecting hook, the padded covering also made of nylon and slidable on the nylon webbing;
   f. said leash for a handle further comprising a flexible section supporting said mating member of said quick disconnect buckle assembly and also supporting a leash assembly having one mating buckle on the flexible section and a second mating buckle at one end of the leash handle so that the leash handle can be opened to expose one mating buckle; and
   g. said connecting hook assembly further comprising a mating buckle which receives the mating buckle from the leash handle when the leash handle is in the opened condition.

2. The hands free dog leash in accordance with claim 1 wherein the flexible belt is made of nylon, each webbing tab is made of nylon and the leash handle is made of nylon.

3. The hands free dog leash in accordance with claim 1 wherein each connector at the end of the flexible cord is made of plastic, the flexible cord is made of plastic, the pulley cover is made of plastic, the quick release disconnect buckles are made of plastic and the connector members at either end of the elastic coil are made of plastic.

4. The hands free dog leash in accordance with claim 1 wherein the connecting hook assembly further comprises a set screw means by which the connecting hook assembly can be removed and replaced with another connecting hook assembly.

5. The hands free dog leash in accordance with claim 1 wherein a mounting bracket which can be mounted on a wall has a pair of mating buckle members wherein one mating buckle of the mounting bracket can receive a mating buckle from the belt and the other mating buckle from the mounting bracket can receive the mating buckle from the connecting hook assembly to thereby store the hands free dog leash when it is not in use.

6. A hands free dog leash to be used by a person having a waist and a pair of oppositely disposed hips and attached to a portion of a dog collar, the dog leash comprising:
   a. a belt worn around the waist of the person and fastened behind the person by a mating buckle assembly attached to each respective end of the belt, a flexible belt having a pair of webbing tabs respectively affixed onto the belt at a location adjacent each respective hip area of the person;
   b. a flexible waist cord having opposite ends with a connector member attached to each respective end, each connector member connected to a respective webbing tab by a metal swivel;
   c. a pulley rotatably mounted on the flexible cord so that the pulley can ride on the flexible cord, the pulley having a covering sleeve mounted on the pulley at one end and having a receiving slot at its opposite end which received a flexible webbing within the receiving slot, the flexible webbing also supporting one mating member of a quick disconnect buckle assembly;
   d. a leash handle having a mating member of a quick disconnect buckle assembly at one end which interconnects with the mating quick disconnect buckle assembly supported by the flexible webbing;
   e. an elastic coil having a connector member at one end through which it is connected to a metal swivel attached to an end of the leash handle and connected at its opposite end by another connector to a metal swivel which in turn is connected to a connecting hook assembly, the connecting hook assembly having a connecting hook at its opposite end and a padded covering member which can cover at least a portion of the connecting hook when it is in use attached to a portion of the dog collar;
   f. said leash handle further comprising a flexible section supporting said mating member of said quick disconnect buckle assembly and also supporting a leash assembly having one mating buckle on the flexible section and a second mating buckle at one end of the leash handle so that the leash handle can be opened to expose one mating buckle; and
   g. the connecting hook assembly further comprising a mating buckle which receives the mating buckle from the leash handle when the leash handle is in the opened condition.

7. The hands free dog leash in accordance with claim 6 wherein the flexible belt is made of nylon, the flexible webbing attached to the pulley covering sleeve is made of nylon, each webbing tab is made of nylon and the leash handle is made of nylon.

8. The hands free dog leash in accordance with claim 6 wherein each connector at the end of the flexible cord is made of plastic, the flexible cord is made of plastic, the pulley covering sleeve is made of plastic, the quick release disconnect buckles are made of plastic and the connector members at either end of the elastic coil are made of plastic.

9. The hands free dog leash in accordance with claim 6 wherein the connecting hook assembly further comprises a nylon webbing connected at one end to the metal swivel, and at its other end to the connecting hook, the padded covering also made of nylon and slidable on the nylon webbing.

10. The hands free dog leash in accordance with claim 6 wherein the connecting hook assembly further comprises a set screw means by which the connecting hook assembly can be removed and replaced with another connecting hook assembly.

11. The hands free dog leash in accordance with claim 6 wherein a mounting bracket which can be mounted on a wall has a pair of mating buckle members wherein one mating buckle of the mounting bracket can receive a mating buckle from the belt and the other mating buckle from the mounting bracket can receive the mating buckle from the connecting hook assembly to thereby store the hands free dog leash when it is not in use.

12. A hands free dog leash to be used by a person having a waist and attached to a portion of a dog collar, the dog leash comprising:
   a. a belt for wearing around the waist of the person and fastening around the person's waist, a flexible belt having a pair of connecting means respectively affixed onto the belt at two spaced apart locations on the flexible belt;
   b. a flexible waist cord having opposite ends with each end respectively connected to a connecting means on the flexible belt by a swivel;
   c. a pulley rotatably mounted on the flexible cord so that the pulley can ride on the flexible cord, means connecting the pulley to one mating member of a quick disconnect buckle assembly attached to the pulley;
   d. a leash handle having a mating member of a quick disconnect buckle assembly at one end which interconnects with the mating quick disconnect buckle assembly attached to the pulley; and
   e. an elastic coil having opposite ends and connected at one end to a swivel which in turn is connected to an end of the leash handle and connected at its opposite end to a swivel which in turn is connected to a connecting hook assembly, the connecting hook assembly comprising a nylon webbing connected at one end to the swivel, and at its other end to the other end to the connecting hook, and having a connecting hook at its opposite end and a padded covering member, made of nylon and slidable on the nylon webbing, which can cover at least a portion of the connecting hook when it is in use attached to a portion of the dog collar;
   f. the leash handle further comprising a flexible section supporting said mating member of said quick disconnect buckle assembly and also supporting a leash assembly having one mating buckle on the flexible section and a second mating buckle at one end of the leash handle so that the leash handle can be opened to expose one mating buckle; and
   g. the connecting hook assembly further comprising a mating buckle which receives the mating buckle from the leash handle when the leash handle is in the opened condition.

13. The hands free dog leash in accordance with claim 12 wherein the flexible belt is made of nylon, and the leash handle is made of nylon.

14. The hands free dog leash in accordance with claim 12 wherein the flexible cord is made of plastic, and the quick release disconnect buckles are made of plastic.

15. The hands free dog leash in accordance with claim 12 wherein the connecting hook assembly further comprises a set screw means by which the connecting hook assembly can be removed and replaced with another connecting hook assembly.

16. The hands free dog leash in accordance with claim 12 wherein a mounting bracket which can be mounted on a wall has a pair of mating buckle members wherein one mating buckle of the mounting bracket can receive a mating buckle from the belt and the other mating buckle from the mounting bracket can receive the mating buckle from the connecting hook assembly to thereby store the hands free dog leash when it is not in use.

17. A hands free dog leash to be used by a person and attached to a portion of a dog collar, the dog leash comprising:
  a. a belt for wearing around a portion of the person's body;
  b. a flexible waist cord having opposite ends with each end respectively connected by a swivel at spaced apart locations on the flexible belt;
  c. a pulley rotatably mounted on the flexible cord so that the pulley can ride on the flexible cord, means connecting the pulley to one mating member of a quick disconnect buckle assembly attached to the pulley;
  d. a leash handle having a mating member of a quick disconnect buckle assembly at one end which interconnects with the mating quick disconnect buckle assembly attached to the pulley;
  e. an elastic coil have opposite ends and connected at one end to a swivel which in turn is connected to an end of the leash handle and connected at its opposite end to a swivel which in turn is connected to a connecting hook assembly, the connecting hook assembly having a connecting hook at its opposite end, the connecting hook assembly further-comprises a nylon webbing connected at one end to the swivel, and at its other end to the connecting hook;
  f. the leash handle further comprising a flexible section supporting said mating member of said quick disconnect buckle assembly and also supporting a leash assembly having one mating buckle on the flexible section and a second mating buckle at one end of the leash handle so that the leash handle can be opened to expose one mating buckle; and
  g. the connecting hook assembly further comprising a mating buckle which receives the mating buckle from the leash handle when the leash handle is in the opened condition.

18. The hands free dog leash in accordance with claim 17 wherein the flexible belt is made of nylon, and the leash handle is made of nylon.

19. The hands free dog leash in accordance with claim 17 wherein the flexible cord is made of plastic, and the quick release disconnect buckles are made of plastic.

20. The hands free dog assembly in accordance with claim 17 further comprising a padded covering member which can cover at least a portion of the connecting hook when it is in use attached to a portion of the dog collar.

21. The hands free dog leash in accordance with claim 17 wherein the connecting hook assembly further comprises a set screw means by which the connecting hook assembly can be removed and replaced with another connecting hook assembly.

22. The hands free dog leash in accordance with claim 17 wherein said belt has a buckle and a mounting bracket which can be mounted on a wall has a pair of mating buckle members wherein one mating buckle of the mounting bracket can receive the buckle from the belt and the other mating buckle from the mounting bracket can receive the mating buckle from the connecting hook assembly to thereby store the hands free dog leash when it is not in use.

23. A hands free dog leash to be used by a person and attached to a portion of a dog collar, the dog leash comprising:
  a. a belt for wearing around a portion of the person's body;
  b. a flexible waist cord having opposite ends with each end respectively connected by a swivel at spaced apart locations on a flexible belt;
  c. a pulley rotatably mounted on the flexible cord so that the pulley can ride on the flexible cord, means connecting the pulley to one mating member of a quick disconnect buckle assembly attached to the pulley; and
  d. a leash handle having a mating member of a quick disconnect buckle assembly at one end which interconnects with the mating quick disconnect buckle assembly attached to the pulley, and a leash connected at its opposite end to elastic means which terminates in a connecting hook which can be attached to a dog collar, the connecting hook comprising a nylon webbing connected at one end to the swivel, and at its other end to the connecting hook;
  e. said leash for a handle further comprising a flexible section supporting said mating member of said quick disconnect buckle assembly and also supporting a leash assembly having one mating buckle on the flexible section and a second mating buckle at one end of the leash handle so that the leash handle can be opened to expose one mating buckle; and
  f. said connecting hook assembly further comprising a mating buckle which receives the mating buckle from the leash handle when the leash handle is in the opened condition.

24. A hands free dog collar in accordance with claim 23 wherein said elastic means which terminates in a connecting hook further comprises an elastic coil having opposite ends and connected at one end to a swivel which in turn is connected to an end of the leash handle and connected at its opposite end to a swivel which in turn is connected to a connecting hook assembly, the connecting hook assembly having the connecting hook at its opposite end.

25. The hands free dog leash in accordance with claim 23 wherein the flexible belt is made of nylon, and the leash handle is made of nylon.

26. The hands free dog leash in accordance with claim 23 wherein the flexible cord is made of plastic, and the quick release disconnect buckles are made of plastic.

27. The hands free dog assembly in accordance with claim 23 further comprising a padded covering member which can cover at least a portion of the connecting hook when it is in use attached to a portion of the dog collar.

28. The hands free dog leash in accordance with claim 23 wherein the connecting hook assembly further comprises a set screw means by which the connecting hook assembly can be removed and replaced with another connecting hook assembly.

29. A hands free dog leash to be used by a person having a waist and a pair of oppositely disposed hips and attached to a portion of a dog collar, the dog leash comprising:
  a. a belt for wearing around the waist of the person and fastening behind the person by a mating buckle assembly attached to each respective end of the belt, a flexible belt having a pair of webbing tabs respectively affixed onto the belt at a location adjacent each respective hip area of the person;
  b. a flexible waist cord having opposite ends with a connector member attached to each respective end, each connector member connected to a respective webbing tab by a metal swivel;
  c. a pulley rotatably mounted on the flexible cord so that the pulley can ride on the flexible cord, the pulley having a covering means and one mating member of a quick disconnect buckle assembly attached to the pulley cover;
  d. a leash handle having a mating member of a quick disconnect buckle assembly at one end which interconnects with the mating quick disconnect buckle assembly attached to the covering means of the pulley, the leash handle further comprising a flexible section supporting said mating member of said quick disconnect buckle assembly and also supporting a leash assembly having one mating buckle on the flexible section and a second mating buckle at one end of the leash handle so that the leash handle can be opened to expose one mating buckle, the mating buckle receiving the mating buckle from the leash handle when the leash handle is in the opened condition; and e. an elastic coil having a connector member at one end through which it is connected to a metal swivel attached to an end of the leash handle and connected at its opposite end by another connector to a metal swivel which in turn is connected to a connecting hook assembly, the connecting hook assembly having a connecting hook at its opposite end and a padded covering member which can cover at least a portion of the connecting hook when it is in use attached to a portion of the dog collar.

30. A hands free dog leash to be used by a person having a waist and attached to a portion of a dog collar, the dog leash comprising:

a. a belt for wearing around the waist of the person and fastening around the person's waist, a flexible belt having a pair of connecting means respectively affixed onto the belt at two spaced apart locations on the flexible belt;

b. a flexible waist cord having opposite ends with each end respectively connected to a connecting means on the flexible belt by a swivel;

c. a pulley rotatably mounted on the flexible cord so that the pulley can ride on the flexible cord, means connecting the pulley to one mating member of a quick disconnect buckle assembly attached to the pulley;

d. a leash handle having a mating member of a quick disconnect buckle assembly at one end which interconnects with the mating quick disconnect buckle assembly attached to the pulley, the leash hand further comprising a flexible section supporting said mating member of said quick disconnect buckle assembly and also supporting a leash assembly having one mating buckle on the flexible section and a second mating buckle at one end of the leash handle so that the leash handle can be opened to expose one mating buckle, the mating buckle receiving the mating buckle from the leash handle when the leash handle is in the opened condition; and e. an elastic coil having opposite ends and connected at one end to a swivel which in turn is connected to an end of the leash handle and connected at its opposite end to a swivel which in turn is connected to a connecting hook assembly, the connecting hook assembly having a connecting hook at its opposite end and a padded covering member which can cover at least a portion of the connecting hook when it is in use attached to a portion of the dog collar.

31. A hands free dog leash to be used by a person and attached to a portion of a dog collar, the dog leash comprising:

a. a belt for wearing around a portion of the person's body;

b. a flexible waist cord having opposite ends with each end respectively connected by a swivel at spaced apart locations on the flexible belt;

c. a pulley rotatably mounted on the flexible cord so that the pulley can ride on the flexible cord, means connecting the pulley to one mating member of a quick disconnect buckle assembly attached to the pulley;

d. a leash handle having a mating member of a quick disconnect buckle assembly at one end which interconnects with the mating quick disconnect buckle assembly attached to the pulley, the leash handle further comprising a flexible section supporting said mating member of said quick disconnect buckle assembly and also supporting a leash assembly having one mating buckle on the flexible section and a second mating buckle at one end of the leash handle so that the leash handle can be opened to expose one mating buckle, the connecting hook assembly further comprising a mating buckle which receives the mating buckle from the leash handle when the leash handle is in the opened condition; and e. an elastic coil have opposite ends and connected at one end to a swivel which in turn is connected to an end of the leash handle and connected at its opposite end to a swivel which in turn is connected to a connecting hook assembly, the connecting hook assembly having a connecting hook at its opposite end.

* * * * *